United States Patent
Henderson et al.

(10) Patent No.: US 8,990,814 B2
(45) Date of Patent: Mar. 24, 2015

(54) REPLACEMENT OF VIRTUAL FUNCTIONS

(75) Inventors: Jared E. Henderson, Maple Valley, WA (US); Mark T. Schofield, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 538 days.

(21) Appl. No.: 13/288,852

(22) Filed: Nov. 3, 2011

(65) Prior Publication Data

US 2013/0117746 A1    May 9, 2013

(51) Int. Cl.
*G06F 9/46*    (2006.01)

(52) U.S. Cl.
CPC ....................................... *G06F 9/46* (2013.01)
USPC ........................................................ 718/100

(58) Field of Classification Search
None
See application file for complete search history.

(56) References Cited

U.S. PATENT DOCUMENTS

| | | | |
|---|---|---|---|
| 6,240,545 B1 | 5/2001 | Carmichael et al. | |
| 8,458,630 B1 * | 6/2013 | Van Canpenhout | 716/104 |
| 8,578,352 B1 * | 11/2013 | Mitrovic et al. | 717/140 |
| 2003/0115584 A1 * | 6/2003 | Fahs et al. | 717/158 |

FOREIGN PATENT DOCUMENTS

EP        0811192 A1    12/1997

OTHER PUBLICATIONS

Kelly, Barry, "Virtual Method Interception", Retrieved at <<http://blog.barrkel.com/2010/09/virtual-method-interception.html>>, Sep. 1, 2010, pp. 6.

Podwysocki, Matthew, "Unity Community Contributions and Interception", Retrieved at <<http://weblogs.asp.net/podwysocki/archive/2008/04/11/unity-community-contributions-and-interception.aspx>>, Apr. 11, 2008, pp. 4.

"Using Interception with Unity", Retrieved at <<http://msdn.microsoft.com/en-us/library/ff647107.aspx>>, Retrieved Date: Jul. 28, 2011, pp. 5.

Shamray, Volodymyr, "Intercepting Calls to COM Interfaces", Retrieved at <<http://www.codeproject.com/KB/recipes/com-interception.aspx>>, Feb. 2, 2011, pp. 6.

Hunt, et al., "Intercepting and Instrumenting COM Applications", Retrieved at <<http://www.google.co.in/url? sa=t&source=web&cd=1&ved=0CBcQFjAA&url=http%3A%2F%2Fciteseerx.ist.psu.edu%2Fviewdoc%2Fdownload%3Fdoi%3D10.1.1.99.8103%26rep%3Drep1%26type%3Dpdf&ei=hkAxTtfaFO_ZiALAttWzBg&usg=AFQjCNETUD6KoPp5hLjSp8neAkYrU2b3uw>>, Proceedings of the 5th USENIX Conference on Object-Oriented Technologies and Systems (COOTS), May 3-7, 1999, pp. 13.

Crankhank, "DLL Injection and Function Interception Tutorial", Retrieved at <<http://www.codeproject.com/KB/DLL/DLL_Injection_tutorial.aspx?msg=700762, Oct. 23, 2003, pp. 5.

"Virtual Method Tables", Retrieved at <<http://eelcovisser.org/post/11/virtual-method-tables>>, May 8, 2011, pp. 7.

* cited by examiner

*Primary Examiner* — Gregory A Kessler
(74) *Attorney, Agent, or Firm* — Kevin Sullivan; Kate Drakos; Micky Minhas

(57) ABSTRACT

Techniques are described for replacement of virtual functions. In one or more implementations, a call to a virtual function is intercepted and redirected to a shim module associated with a replacement function. The shim module is configured to adjust a pointer (e.g., a "this" pointer) for the virtual function. In at least some embodiments, the pointer can be adjusted based on information retrieved from symbol data for the virtual function. The replacement function can utilize the adjusted pointer to access an object instance associated with the virtual function. For example, the replacement function can use the adjusted pointer to access data and/or functionalities of the object instance.

20 Claims, 5 Drawing Sheets

REPLACEMENT OF VIRTUAL FUNCTIONS

BACKGROUND

A typical computing device employs a wide variety of executable program code to perform various tasks. For example, program code can be included as part of an operating system, an application, a utility, and/or other functionality that can be executed via a computing device. Such program code typically includes functions that can be called to perform various tasks. For example, a particular function can be called by an application to calculate a value based on parameters that are passed to the function.

Included with such functions are virtual functions. A virtual function refers generally to a function in object-oriented programming that is a member function of a base class and whose functionality can be overridden in a derived class of the base class. Virtual functions can be called on derived classes to enable different tasks and/or functionalities to be performed than are provided by a base class of the derived classes.

In certain scenarios, it can be useful to intercept a call to a virtual function and redirect the call to a replacement function. For example, a software testing utility can intercept a call to a virtual function by an application. The utility can then redirect the call to a replacement function in order to test various operating scenarios that may arise when the application is executed. Current techniques for replacing a virtual function with a replacement function are time and resource intensive, and are prone to errors that can be introduced due to changes in class layout and/or compiler settings.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques are described for replacement of virtual functions. In one or more implementations, a call to a virtual function is intercepted and redirected to a shim module associated with a replacement function. The shim module is configured to adjust a pointer (e.g., a "this" pointer) for the virtual function. The replacement function can utilize the adjusted pointer to access an object instance associated with the virtual function. For example, the replacement function can use the adjusted pointer to access data and/or functionalities of the object instance.

In at least some embodiments, a pointer for a virtual function can be adjusted based on information retrieved from symbol data for the virtual function. Examples of symbol data include private symbols, public symbols, debug symbols, and so on. The information retrieved from the symbol data can include a memory offset value associated with the virtual function. The adjusted pointer can point to an object instance for the virtual function and thus enable a replacement function to utilize the adjusted pointer to interact with the object instance.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques are described for replacement of virtual functions. In one or more implementations, a call to a virtual function is intercepted and redirected to a shim module associated with a replacement function. The shim module is configured to adjust a pointer (e.g., a "this" pointer) for the virtual function. The replacement function can utilize the adjusted pointer to access an object instance associated with the virtual function. For example, the replacement function can use the adjusted pointer to access data and/or functionalities of the object instance.

In at least some embodiments, a pointer for a virtual function can be adjusted based on information retrieved from symbol data for the virtual function. Examples of symbol data include private symbols, public symbols, debug symbols, and so on. The information retrieved from the symbol data can include a memory offset value associated with the virtual function. The adjusted pointer can point to an object instance for the virtual function and thus enable a replacement function to utilize the adjusted pointer to interact with the object instance.

In the following discussion, an example environment is first described that is operable to employ techniques for replacement of virtual functions described herein. Next, a section entitled "Example Methods" describes example methods which may be employed in the example environment as well as in other environments. Last, a section entitled "Example System and Device" describes aspects of an example system and an example device that can be utilized to implement one or more embodiments.

Example Environment

Figure 1:
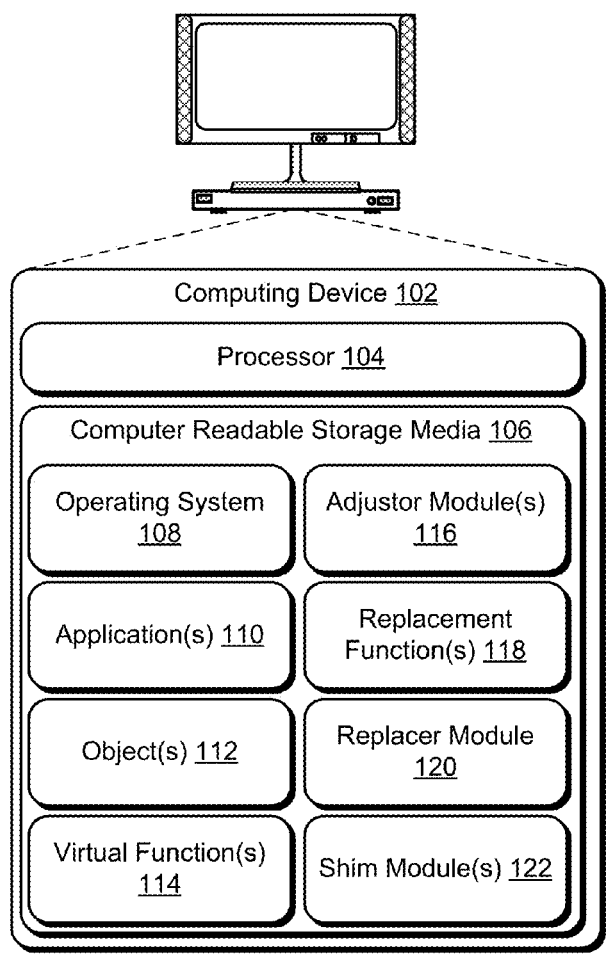
FIG. 1 is an illustration of an environment in an example implementation that is operable to employ techniques for replacement of virtual functions.

FIG. 1 is an illustration of an environment 100 in an example implementation that is operable to employ techniques for replacement of virtual functions. Environment 100 includes a computing device 102 having one or more processors 104 and one or more computer-readable storage media 106. Computing device 102 can be embodied as any suitable computing device such as, by way of example and not limitation, a desktop computer, a portable computer, a handheld computer such as a personal digital assistant (PDA), mobile phone, tablet computer, and the like. One of a variety of different examples of a computing device 102 is shown and described below in FIGS. 4 and 5.

The computing device 102 further includes an operating system 108 and one or more applications 110 that reside on the computer-readable storage media 106 and which are executable by the processor 104. The operating system 108 is representative of functionality to manage and provide access to resources of the computing device 102. The applications 110 are representative of functionalities that enable a wide variety of tasks to be performed via the computing device 102, such as word processing, email, spreadsheet, media content consumption, software and/or hardware testing, and so on.

Further residing on the computer-readable storage media 106 are one or more objects 112 and one or more virtual functions 114. The objects 112 refer to instances of data objects (e.g., component object model (COM) objects) that include various properties, such as identities, states, and behaviors. An identity for an object 112 is a property that distinguishes the object from others of the objects 112. A state for an object 112 refers to the data that is stored as part of the object. Behaviors for an object 112 include methods and/or other functionalities that can be called on an object to perform various tasks.

To enable behaviors for the objects 112 to be implemented, the virtual functions 114 are provided. The virtual functions 114 include functions that can be called on the objects 112 to perform various tasks. The term "function" refers generally to a portion of code that can be executed by the computing device 102 to perform a task. Examples of functions include routines, subroutines, procedures, methods, subprograms, and so on. In implementations, one or more of the objects 112 can include respective functions of the virtual functions 114 such that the one or more objects can provide access to a particular virtual function and/or group of virtual functions.

In implementations, a virtual function refers to a function whose implementation can be overridden by a derived data class associated with the function. For example, consider a parent class A that has a subclass B and method "print" for the class A. The subclass B can inherit the "print" method from class A and can also provide a different implementation of the method than is provided by the class A. Thus, the "print" method can be called on either the class A or the subclass B to provide different implementations of the method. In embodiments, calling the "print" method provided by the class B can override the implementation of the method provided by the class A. Thus, the "print" method can be considered a virtual function based on the ability of the Class B to inherit the method from the Class A and to override the implementation of the method provided by the Class A.

As mentioned above, particular virtual functions 114 can be associated with particular objects 112. Thus, when a particular virtual function is called, the virtual function can interact with an associated object to retrieve data (e.g., values) from the object and/or interact with other behaviors of the object. To enable a particular virtual function 114 to interact with its associated object, a pointer (e.g., a "this pointer") that points to its associated object 112 can be provided to the virtual function. The pointer can include a memory address for an associated object and/or attributes of the object. The pointer can be used by the virtual function to access an associated object and retrieve data and/or interact with functionalities of the object.

To enable pointers to be provided to the virtual functions 114, one or more adjustor modules 116 are provided. In implementations, one or more of the virtual functions 114 are associated with and/or specific to respective adjustor modules 116. The adjustor modules 116 are representative of functionality to adjust pointers such that the pointers reference an object and/or specific portion of an object that is associated with a virtual function. For example, with reference to the "class A/subclass B" example discussed above, the "print" method exposed by the subclass B can override that of the class A. When an object associated with the classes is compiled, a pointer can be configured to point to the address of class A, as the introducing class of the "print" method.

To enable the overriding class B implementation of the "print" method to be invoked and interact with an associated object, a particular adjustor module 116 associated with the method can adjust the pointer based on a memory offset between an address for the associated object and the address for the class A. In implementations, the offset value can be exposed as the TI_GET_THISADJUST constant value associated with the object. The adjusted pointer can be passed to the class B implementation of the method as part of a call to the method. The class B implementation of the method can utilize the adjusted pointer to interact with the object as a whole, e.g., to retrieve data values and/or interact with other functionalities of the object.

Further residing on the computer-readable storage media 106 are one or more replacement functions 118 and a replacer module 120. The replacement functions 118 are representative of functions that can be employed to replace other functions of the computing device 102, such as one or more of the virtual functions 114. The replacer module 120 is representative of functionality to enable functions associated with the computing device to be replaced. In implementations, the replacer module 120 is user-configurable such that a user can specify particular replacement functions 118 to be used to replace particular virtual functions 114.

The computer-readable storage media 106 further include one or more shim modules 122, which are representative of functionality to receive redirected calls to virtual functions and adjust pointers (e.g., "this" pointers) associated with the calls. The replacement functions 118 can use the adjusted pointers to interact with objects associated with replaced virtual functions of the virtual functions 114. In implementations, signatures and calling conventions for the shim modules 122 match those of corresponding virtual functions 114. Further, the shim modules 122 are configured to accept parameters that the corresponding virtual functions 114 are configured to accept. Thus, the shim modules 122 can accept redirected calls to the virtual functions 114 and perform various operations based on the calls.

As discussed above, the adjustor modules 116 can make adjustments to pointers to enable the virtual functions 114 to interact with their associated objects 112. In implementations, however, the adjustments made to pointers by the adjustor modules 116 are class-specific to particular virtual functions 114 and their associated objects 112. Thus, the replacement functions 118 may not be configured to utilize a pointer that has been adjusted by one of the adjustor modules 116 to interact with an object associated with a replaced virtual function.

For example, the replacement functions 118 may not be configured to compensate for adjustments made to pointers by the adjustor modules 116. Thus, if one of the replacement functions 118 intercepts a function call to one of the virtual functions 114 that includes a pointer that has been adjusted by one of the adjustor modules 116, the replacement function may not be configured to use the adjusted pointer to interact with an object associated with the intercepted function call. For example, the pointer may have been adjusted based on a class layout for the object that the replacement function is not configured to compensate for when attempting to access the object.

To enable the replacement functions 118 to interact with objects associated with replaced methods of the virtual functions 114, the shim modules 122 can process a pointer that has been adjusted (e.g., by one of the adjustor modules 116) such that the pointer points to the address of the associated object instead of pointing to the introducing class for the replaced virtual function. For example, the shim modules can reverse adjustments made to pointers by the adjustor modules 116. This can enable the replacement method to access various data values and/or functionalities included as part of the object. Further aspects of these and other techniques are discussed in more detail below.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Having described an example environment in which the techniques described herein may operate, consider now a discussion of some example methods in accordance with one or more embodiments.

Example Methods

Discussed below are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100 and below with reference to the system 400.

Figure 2:
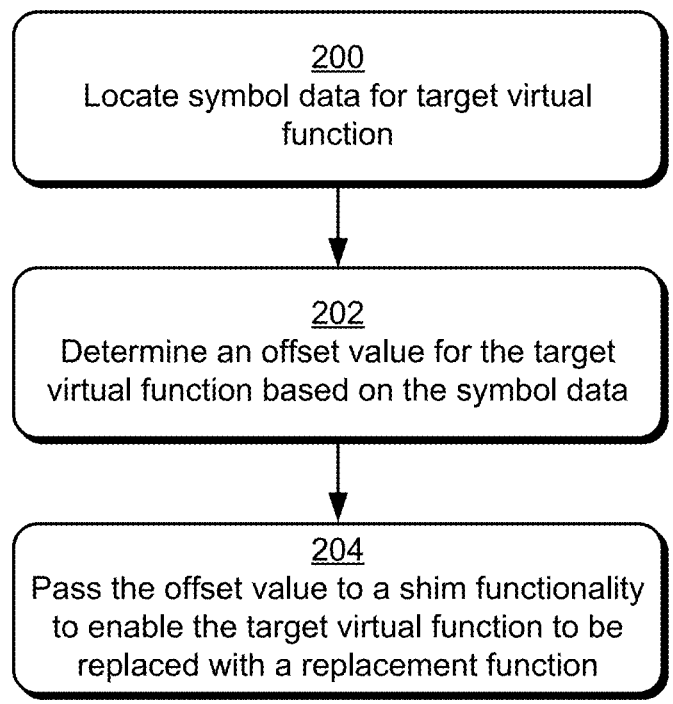
FIG. 2 is a flow diagram that describes steps in a method in accordance with one or more embodiments.

FIG. 2 is a flow diagram that describes steps in a method in accordance with one or more embodiments. Step 200 locates symbol data for a target virtual function. For example, symbol data can be located for one or more of the virtual functions 114 and/or objects 112 associated with the virtual functions. Symbol data can include private symbols, public symbols, debug symbols, and so on. In implementations, the symbol data can include information such as functions, global variables, local variables, information about structures, classes, and data types for objects, and so on. The symbol data can also include addresses for one or more of the virtual functions 114. In at least some embodiments, a debugger functionality (e.g., debugging a utility, a debugging application programming interface (API), and so on) can be implemented to find the symbol data.

Step 202 determines an offset value for the target virtual function based on the symbol data. For example, the symbol data can include an offset value that is used to adjust a pointer (e.g., a "this" pointer) when the target virtual function is called. In implementations, the offset value can be exposed as a "thisAdjust" value as part of the symbol data for the target virtual function.

Step 204 passes the offset value to a shim functionality to enable the target virtual function to be replaced with a replacement function. For example, one of the adjustor modules 116 can pass the offset value to one of the shim modules 122. The shim module can use the offset value to adjust a pointer that is to be passed to a replacement function. Further details concerning implementation of the shim functionality are discussed below.

Figure 3:
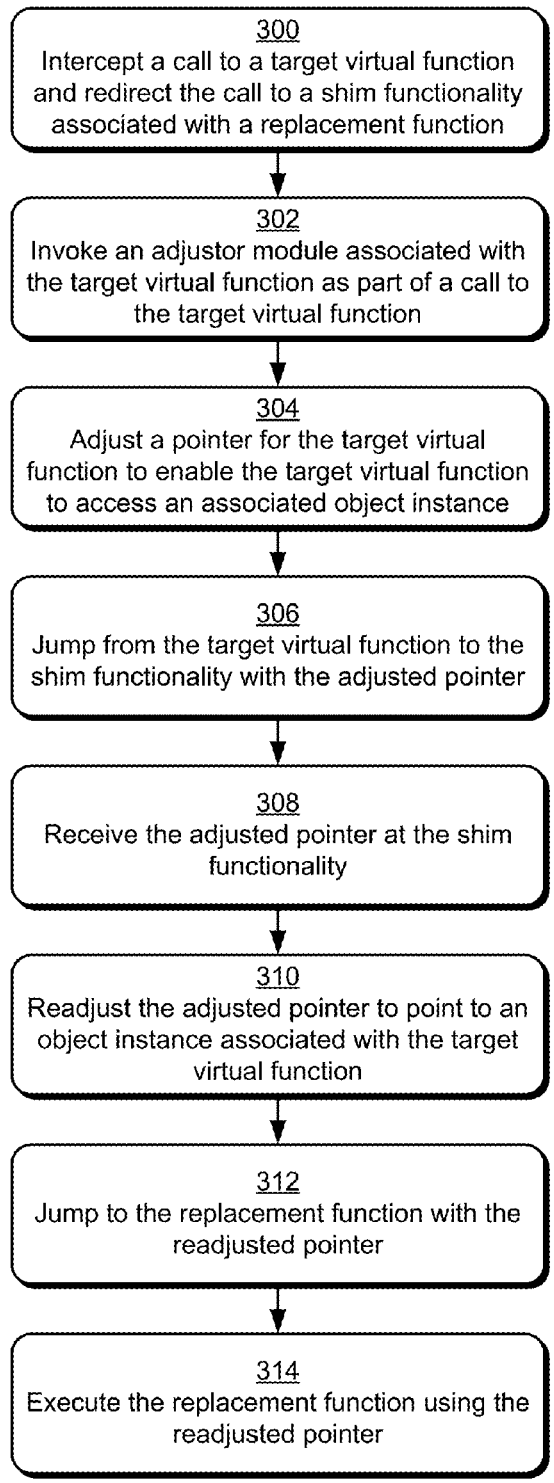
FIG. 3 is a flow diagram that describes steps in a method in accordance with one or more embodiments.

FIG. 3 is a flow diagram that describes steps in a method in accordance with one or more embodiments. In implementations, the method can be employed to enable a target virtual function to be replaced with a replacement function. Step 300 intercepts a call to a target virtual function and redirects the call to a shim functionality associated with a replacement function. For example, the replacer module 120 can be implemented to configure one of the virtual functions 114 such that a call to the virtual function jumps to one of the shim modules 122. As mentioned above, particular shim modules 122 can be associated with particular virtual functions 114.

Step 302 invokes an adjustor module associated with the target virtual function as part of a call to the target virtual function. For example, one of the applications 110 can invoke one of the adjustor modules 114 in order to access one of the virtual functions 114 associated with the adjustor module. Step 304 adjusts a pointer for the target virtual function to enable the target virtual function to access an associated object instance. For instance, one of the adjustor modules 116 associated with the target virtual function can adjust the pointer (e.g., a "this" pointer) based on an offset between a memory address for one of the objects 112 associated with the target virtual function, and a memory address for an introducing class within the object for the target virtual function. This can enable the target virtual function to access data values and/or functionalities of the object for a class in which the target virtual function is declared.

Step 306 jumps from the target virtual function to the shim functionality with the adjusted pointer. For example, one of the adjustor modules 116 can jump to one of the virtual functions 114, which can then jump to one of the shim modules 122 associated with the virtual function based on an intercepted call to the virtual function. In implementations, step 306 can occur in response to a call to the target virtual function being intercepted, such as discussed above with reference to step 300. Step 308 receives the adjusted pointer at the shim functionality.

Step 310 readjusts the adjusted pointer to point to an object instance associated with the target virtual function. For example, one of the shim modules 122 can apply an offset to the pointer that enables one of the replacement functions 118 to interact with one of the objects 112. The offset can be determined based on symbol files for the object, as discussed above with reference to FIG. 2. In implementations, the offset can correspond to an offset applied at step 304, above.

Step 312 jumps to the replacement function with the readjusted pointer. For example, one of the shim modules 122 can cause a jump to one of the replacement functions 118 with a readjusted "this" pointer. Step 314 executes the replacement function using the readjusted pointer. For instance, the readjusted pointer can indicate a memory address for an object instance associated with a replaced virtual function. Using the readjusted pointer, the replacement function can access data and/or functionalities of the object instance. In implementations, one or more aspects (e.g., steps) of the methods discussed above can be implemented at an application run time for an application that is calling a target virtual function. Thus, techniques discussed herein can enable virtual functions to be dynamically replaced (e.g., at an application run time) with replacement functions, and replacement functions to interact with object instances associated with replaced virtual functions.

Having described example methods in accordance with one or more embodiments, consider now a discussion of an example system and an example device in accordance with one or more embodiments.

Example System and Device

Figure 4:
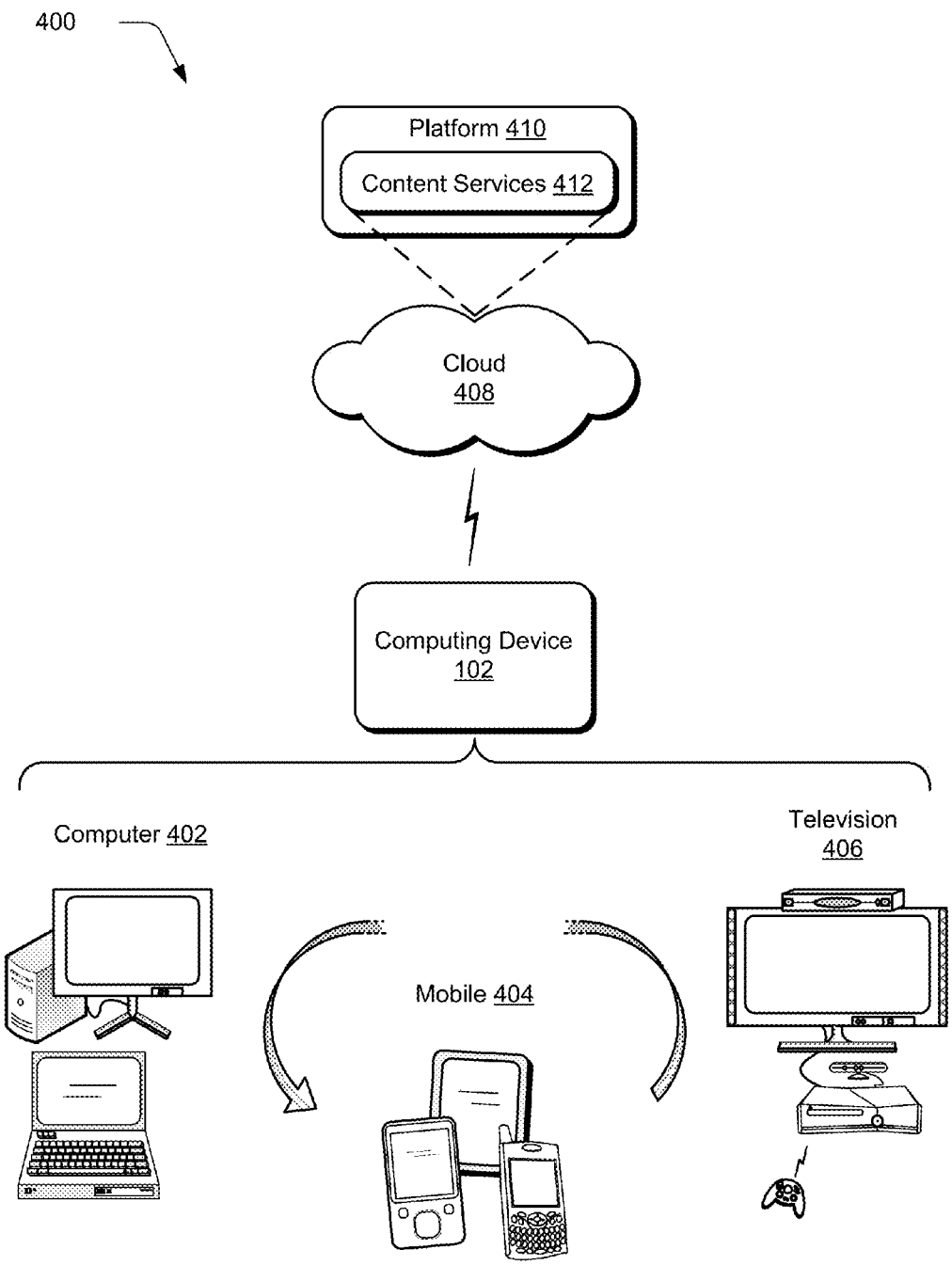
FIG. 4 illustrates an example system that includes the computing device as described with reference to FIGS. 1 and 5 in accordance with one or more embodiments.

FIG. 4 illustrates an example system 400 showing the computing device 102 as being implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described the computing device 102 may be configured in a variety of different ways, such as for mobile 402, computer 404, and television 406 uses. Each of these configurations has a generally corresponding screen size and thus the computing device 102 may be configured as one of these device classes in this example system 400. For instance, the computing device 102 may assume the mobile 402 class of device which includes mobile telephones, music players, game devices, and so on.

The computing device 102 may also assume a computer 404 class of device that includes personal computers, laptop computers, netbooks, and so on. The television 406 configuration includes configurations of device that involve display in a casual environment, e.g., televisions, set-top boxes, game consoles, and so on. Thus, techniques described herein may be supported by these various configurations of the computing device 102 and are not limited to the specific examples described in the following sections.

Cloud 408 is illustrated as including a platform 410 for web services 412. The platform 410 abstracts underlying functionality of hardware (e.g., servers) and software resources of the cloud 408 and thus may act as a "cloud operating system." For example, the platform 410 may abstract resources to connect the computing device 102 with other computing devices. The platform 410 may also serve to abstract scaling of resources to provide a corresponding level of scale to encountered demand for the web services 412 that are implemented via the platform 410. A variety of other examples are also contemplated, such as load balancing of servers in a server farm, protection against malicious parties (e.g., spam, viruses, and other malware), and so on.

Thus, the cloud 408 is included as a part of the strategy that pertains to software and hardware resources that are made available to the computing device 102 via the Internet or other networks. For example, techniques for replacement of virtual functions discussed herein may be implemented in part on the computing device 102 as well as via the platform 410 that supports web services 412.

In implementations, input to the computing device 102 may be detected using touchscreen functionality in the mobile configuration 402, track pad functionality of the computer 404 configuration, detected by a camera as part of support of a natural user interface (NUI) that does not involve contact with a specific input device, and so on. Further, performance of the operations to implement techniques discussed herein may be distributed throughout the system 400, such as by the computing device 102 and/or the web services 412 supported by the platform 410 of the cloud 408.

Figure 5:
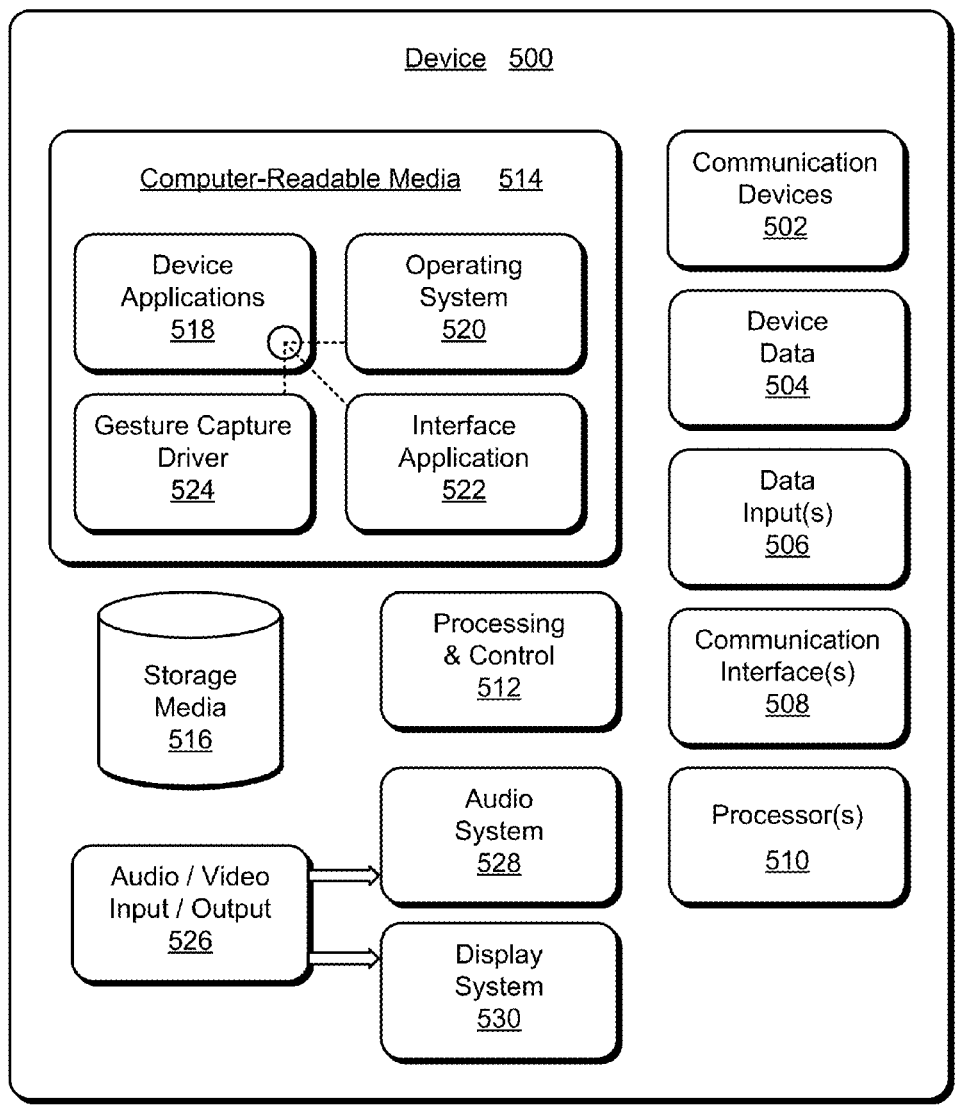
FIG. 5 illustrates an example computing device that can be utilized to implement various embodiments described herein.

FIG. 5 illustrates various components of an example device 500 that can be implemented as any type of portable and/or computer device as described with reference to FIGS. 1 and 4 to implement embodiments of the techniques for replacement of virtual functions described herein. Device 500 includes communication devices 502 that enable wired and/or wireless communication of device data 504 (e.g., received data, data that is being received, data scheduled for broadcast, data packets of the data, etc.). The device data 504 or other device content can include configuration settings of the device, media content stored on the device, and/or information associated with a user of the device. Media content stored on device 500 can include any type of audio, video, and/or image data. Device 500 includes one or more data inputs 506 via which any type of data, media content, and/or inputs can be received, such as user-selectable inputs, messages, music, television media content, recorded video content, and any other type of audio, video, and/or image data received from any content and/or data source.

Device 500 also includes communication interfaces 508 that can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices communicate data with device 500.

Device 500 includes one or more processors 510 (e.g., any of microprocessors, controllers, and the like) which process various computer-executable or readable instructions to control the operation of device 500 and to implement the gesture embodiments described above. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 also includes computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 500 can also include a mass storage media device 516.

Computer-readable media 514 provides data storage mechanisms to store the device data 504, as well as various device applications 518 and any other types of information and/or data related to operational aspects of device 500. For example, an operating system 520 can be maintained as a computer application with the computer-readable media 514 and executed on processors 510. The device applications 518 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 518 also include system components or modules to implement embodiments of the techniques for replacement of virtual functions described herein.

In this example, the device applications 518 include an interface application 522 and a gesture-capture driver 524 that are shown as software modules and/or computer applications. The gesture-capture driver 524 is representative of software that is used to provide an interface with a device configured to capture a gesture, such as a touchscreen, track pad, camera, and so on. Alternatively or in addition, the interface application 522 and the gesture-capture driver 524 can be implemented as hardware, software, firmware, or any combination thereof.

Device 500 also includes an audio and/or video input-output system 526 that provides audio data to an audio system 528 and/or provides video data to a display system 530. The audio system 528 and/or the display system 530 can include any devices that process, display, and/or otherwise render audio, video, and image data. Video signals and audio signals can be communicated from device 500 to an audio device and/or to a display device via an RF (radio frequency) link, S-video link, composite video link, component video link, DVI (digital video interface), analog audio connection, or other similar communication link. In an embodiment, the audio system 528 and/or the display system 530 are implemented as external components to device 500. Alternatively, the audio system 528 and/or the display system 530 are implemented as integrated components of example device 500.

CONCLUSION

Techniques for replacement of virtual functions are described. Although embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. One or more computer-readable hardware storage media comprising computer-readable instructions which are executable to cause a computing device to perform operations comprising:
   adjusting a pointer received as part of a redirected call to a target virtual function;
   jumping from the target virtual function to shim functionality using the adjusted pointer;
   causing the shim functionality to readjust the adjusted pointer; and
   jumping to a replacement function with the readjusted pointer to enable the replacement function to utilize the readjusted pointer to interact with an object instance associated with the target virtual function.

2. The one or more computer-readable hardware storage media of claim 1, wherein the adjusted pointer comprises a this pointer associated with the target virtual function.

3. The one or more computer-readable hardware storage media of claim 1, wherein the operations further comprise adjusting the pointer based on a memory offset value for the target virtual function.

4. The one or more computer-readable hardware storage media of claim 3, wherein the memory offset value is determined from a TI_GET_THISADJUST constant value associated with the object instance.

5. The one or more computer-readable hardware storage media of claim 1, wherein the replacement function is configured to use the readjusted pointer to access at least one of data or one or more functionalities of the object instance.

6. The one or more computer-readable hardware storage media of claim 1, wherein a signature for the shim functionality matches a signature for the target virtual function.

7. The one or more computer-readable hardware storage media of claim 1, wherein a calling convention for the shim functionality matches a calling convention for the target virtual function.

8. A computing device comprising:
   at least one processor; and
   one or more computer-readable hardware storage media comprising computer-readable instructions that are executable by the at least one processor to cause the computing device to implement operations including:
      adjusting a pointer received as part of a redirected call to a target virtual function based at least in part on an offset between a memory address for an object associated with the target virtual function and a memory address for an introducing class within the object; and
      readjusting the adjusted pointer to point to the object based at least in part on one or more symbols for the object.

9. The computing device of claim 8, wherein the adjusted pointer comprises a this pointer associated with the target virtual function.

10. The computing device of claim 8, the operations further comprising enabling the target virtual function to access data values or functionalities of the object using the adjusted pointer.

11. The computing device of claim 8, the operations further comprising jumping to a replacement function with the readjusted pointer to enable the replacement function to utilize the readjusted pointer to interact with the object associated with the target virtual function.

12. The computing device of claim 8, the operations further comprising executing a replacement function using the readjusted pointer.

13. A computer-implemented method comprising:
adjusting a pointer received as part of a redirected call to a target virtual function;
jumping from the target virtual function to shim functionality using the adjusted pointer;
causing, by a computing device, the shim functionality to readjust the adjusted pointer; and
jumping to a replacement function with the readjusted pointer to enable the replacement function to utilize the readjusted pointer to interact with an object instance associated with the target virtual function.

14. A computer-implemented method as described in claim 13, wherein the adjusted pointer comprises a this pointer associated with the target virtual function.

15. A computer-implemented method as described in claim 13, further comprising adjusting the pointer based on a memory offset value for the target virtual function.

16. A computer-implemented method as described in claim 15, wherein the memory offset value is determined from a TI_GET_THISADJUST constant value associated with the object instance.

17. A computer-implemented method as described in claim 13, wherein the replacement function is configured to use the readjusted pointer to access at least one of data or one or more functionalities of the object instance.

18. A computer-implemented method as described in claim 13, wherein a signature for the shim functionality matches a signature for the target virtual function.

19. A computer-implemented method as described in claim 18, wherein a calling convention for the shim functionality matches a calling convention for the target virtual function.

20. A computer-implemented method as described in claim 13, further comprising executing the replacement function using the readjusted pointer.

* * * * *